United States Patent [19]

Loftin

[11] Patent Number: 5,362,167
[45] Date of Patent: Nov. 8, 1994

[54] FIBER MARKER INCLUDING AN ERASABLE INK

[75] Inventor: Rachel M. Loftin, Halifax, Mass.

[73] Assignee: The Gillette Company, Boston, Mass.

[21] Appl. No.: 12,967

[22] Filed: Jan. 29, 1993

Related U.S. Application Data

[63] Continuation of Ser. No. 809,344, Dec. 18, 1991, abandoned.

[51] Int. Cl.$^5$ .................................................. C08L 9/00
[52] U.S. Cl. ..................................... 401/198; 524/575
[58] Field of Search ............... 523/161; 524/836, 88; 401/199, 198, 196

[56] References Cited

U.S. PATENT DOCUMENTS

| | | |
|---|---|---|
| 3,141,187 | 7/1964 | Simon, Jr. et al. .................. 401/199 |
| 3,425,779 | 2/1969 | Fisher et al. . |
| 3,607,813 | 9/1971 | Purcell ..................................... 524/88 |
| 3,875,105 | 4/1975 | Daugherty et al. . |
| 3,924,520 | 12/1975 | Boardman et al. . |
| 3,949,132 | 4/1976 | Seregely et al. . |
| 4,069,188 | 1/1978 | Canard et al. . |
| 4,097,290 | 6/1978 | Muller et al. . |
| 4,130,691 | 12/1978 | Canard et al. . |
| 4,297,260 | 10/1981 | Ferree, Jr. et al. . |
| 4,329,262 | 5/1982 | Muller . |
| 4,329,264 | 5/1982 | Muller . |
| 4,349,639 | 9/1982 | Muller . |
| 4,389,499 | 6/1983 | Riesgraf . |
| 4,390,646 | 6/1983 | Ferguson . |
| 4,391,927 | 7/1983 | Farmer, III . |
| 4,407,985 | 10/1983 | Muller . |
| 4,410,643 | 10/1983 | Muller .................................. 523/161 |
| 4,471,079 | 9/1984 | Enami . |
| 4,721,739 | 1/1988 | Brenneman et al. ................. 523/161 |
| 4,738,725 | 4/1988 | Daugherty et al. . |
| 4,940,628 | 7/1990 | Lin et al. . |
| 5,120,359 | 6/1992 | Uzukawa et al. ............... 523/161 X |

FOREIGN PATENT DOCUMENTS

| | | |
|---|---|---|
| 0100834 | 2/1984 | European Pat. Off. . |
| 0109726 | 5/1984 | European Pat. Off. . |
| 0180402 | 5/1986 | European Pat. Off. . |
| 2914913 | 10/1980 | Germany . |
| 55-152768 | 11/1980 | Japan . |
| 57-135878 | 8/1982 | Japan . |
| 58-176281 | 10/1983 | Japan . |

OTHER PUBLICATIONS

"Kraton-Thermoplastic Rubber Crumb" brochure.
"SealQuill Dispensing Pens" brochure.

*Primary Examiner*—Danton D. DeMille
*Attorney, Agent, or Firm*—Fish & Richardson

[57] ABSTRACT

An aqueous-based erasable ink composition suitable for use in highlighters and other writing instruments includes a styrene-butadiene copolymer and a water-insoluble pigment. It preferably also includes a release agent and an anti-oxidant, and has a viscosity of between 10cps and 30cps.

42 Claims, No Drawings

FIBER MARKER INCLUDING AN ERASABLE INK

This is a continuation of application Ser. No. 07/809,344, filed Dec. 18, 1991 now abandoned.

BACKGROUND OF THE INVENTION

The invention relates to aqueous-based erasable inks.

Aqueous-based erasable inks typically include a film-forming elastomeric polymer and colorant dispersed in water. When the inks are applied to paper, the water evaporates and the polymer provides a coalesced residue on the surface of the paper. The inks are erasable in that the residue can be removed from the paper surface for some period of time after formation without leaving a visible residue or damaging the paper.

SUMMARY OF THE INVENTION

In one aspect, the invention features a pen including a body, a writing tip at one end of the body, a reservoir included within the body, and an aqueous-based, erasable marking composition having a viscosity of between 10cps and 30cps (preferably between 10 cps and 20cps) within the reservoir. The marking composition includes a latex emulsion (a rubber dispersed in water) and a water insoluble colorant, preferably a fluorescent pigment like those commonly used in highlighters. In a preferred embodiment, the pen is a marker, having a porous tip, and the marking composition is delivered to the tip by capillary action.

Preferred compositions for use in the marker include a release agent (preferably a silicone), an anti-oxidant (preferably a cresol), and a latex with a rubber solids content of between 20% and 40% and a viscosity of less than 50cps (more preferably less than 40cps). The composition preferably includes between about 60% and 90% (most preferably 70% and 80%) of the latex by weight. The preferred latexes include a polystyrene-butadiene copolymer having a Mooney value of at least 90.

In another aspect, the invention features an aqueous-based, erasable marking composition that includes a a styrene-butadiene copolymer having a Mooney value of greater than 100.

In another aspect, the invention features an aqueous-based, erasable marking composition that includes a styrene-butadiene copolymer, a water insoluble colorant, and a release agent.

In another aspect, the invention features an aqueous-based, erasable marking composition that includes a styrene/butadiene copolymer, a water-insoluble colorant, and an anti-oxidant.

In another aspect, the invention features an aqueous-based, erasable marking composition that includes a styrene/butadiene copolymer, a water-insoluble colorant, and sufficient water that the viscosity of the composition (at room temperature) is between about 10cps and 30cps, preferably between about 10cps and 20cps.

The erasable inks of the invention provide markings that can be readily removed from paper for a lengthy period of time (more than a year) after the ink is applied, without damaging the paper or leaving a visible residue. The inks are storage-stable, easy to manufacture, and easy to apply. The inks preferably have a low viscosity and as a result are particularly suitable for use with standard felt-tip markers that rely on a capillary feed system to draw ink from a reservoir. Thus, the inks are suitable for use in markers, which typically use fluorescent-colored pigments. One significant advantage to using the inks in markers is that when textbook pages are highlighted by a student, the highlighted portions can be erased a year later when the book is given or sold to a different student.

Other features and advantages of the invention will be apparent from the description of the preferred embodiments thereof, and from the claims.

DESCRIPTION OF THE PREFERRED EMBODIMENTS

The preferred compositions include a styrene/butadiene copolymer, a water-insoluble colorant, a release agent, an anti-oxidant, and water.

The styrene/butadiene copolymer is the film-forming material in the composition. The preferred copolymers are unsubstituted, i.e., they lack chemical groups such as carboxyl, sulfonyl, or amino groups, and have a high modulus of elasticity. The preferred copolymers have a Mooney viscosity of greater than 90, preferably greater than 100. Copolymers with a high Mooney value are preferred because generally they tend to be less crumbly on the paper once the water evaporates, and have a greater rub resistance.

The preferred copolymers have a styrene:butadiene ratio of between 10:90 and 35:6.5, more preferably between 20:80 and 30:70. In general, the higher the styrene content, the more erasable the ink. If the styrene content is lower than 10%, the erasability of the ink tends to deteriorate. If the styrene content is greater than 35%, the inks may have an undesirably high viscosity.

The preferred copolymers are available as latex emulsions from Goodyear Chemicals of Akron, Ohio under the tradename PLIOLITE. The emulsion has a solids content of 30–50% and a Brookfield viscosity (25° C.) of less than about 50cps, more preferably about 30cps or less. The viscosity of the latex preferably is less than 50cps, more preferably less than 40cps. Normally, the ink compositions will include between 60% and 90%, more preferably between about 70% and 80%, of the emulsion by weight. Typically, the composition should include between about 20% and 40% of solid rubber by weight. The most preferred latex emulsion is PLIOLITE LPF-2108.

The preferred colorants are fine grain sized, organic or inorganic pigments or dyes that are insoluble in water. Examples of suitable pigments include carbon blacks and prussian blues; suitable dyes include those that are nitro- or anthroquinone-based. The amount of colorant can vary but usually will not exceed about 5% of the composition by weight. The preferred colorants have a particle size of less than 3 μm.

The more preferred colorants are fluorescent pigments that provide a vibrant, read-through, erasable tracing and which can be photocopied without observing the highlighted material. The especially preferred read-through tracings are provided by including from about 3% to 5% by weight of the fluorescent pigment. Examples of suitable fluorescent pigments include the Day-Glo pigments available from the Day-Glo Color Corp. of Cleveland, Ohio and "Lumikol", from Nippon Keiko Kagaku LTD.

The release agents used in the composition provide a film between the paper surface and the marking, which may be liquid, semi-solid or solid. This film aids in lifting the marking from the surface by a rubbing action with an elastomeric eraser, providing substantially complete removal of the marking from the surface without significant detectable damage to the surface. Preferred release agents include water dispersible silicone oils or silicone surfactants. Especially preferred release agents include combinations of silicone oils and silicone surfactants and particularly combinations of glycol polysiloxanes and silicone glycol copolymers. Normally, amounts of release agents between about 1 to about 10 percent by weight are suitable; for the more preferred release agents amounts between about 4 to about 8 percent by weight are suitable.

The anti-oxidant inhibits the oxidation, and resultant cross-linking, of the styrene/butadiene copolymer. Cross-linking is undesirable because it adversely effects the erasability performance characteristics of the ink, particularly after the inks have been exposed to direct sunlight for a significant period of time. Especially preferred are rubber antioxidants, in particular 4,4'-thiobis (6-tert-butyl-m-cresol) and 4,4'-butylidenebis (6-tert-butyl-m-cresol). Amounts of rubber antioxidant between about 1 to about 2 percent by weight of the rubber solids are normally suitable.

The compositions can include other conventional ingredients. For example, emulsifying agents such as fatty acids (preferably fatty acid diethanolamides) are normally included in the ink in amounts between about 0.3 to about 1 percent by weight to thoroughly disperse the colorant and release agent in the aqueous phase. Dispersing agents also may be included particularly to help disperse the antioxidant.

Sufficient water should be included in the composition so that its Brookfield viscosity (25° C.) is less than about 30cps, more preferably between about 10cps and 20cps. If the viscosity is too low, the ink will tend to absorb into the paper, making erasability difficult. If the viscosity is too high, the compositions may be too thick for practical use, particularly in capillary feed systems.

The compositions generally can be prepared by blending the ingredients under conditions of high shear. The following examples illustrate the invention. Of these examples, the most preferred compositions are those described in Examples 8, 10, 15 and 17.

EXAMPLE 1

| Ingredient | % by weight |
|---|---|
| Dispers blue[1] | 6% |
| Silicone oil[2] | 2% |
| Dow Corning 193[3] | 2% |
| Clindrol 200-0[4] | 1% |
| Santicizer 8[5] | 1% |
| LPF 2108[6] | 70% |
| Water | 18% |

[1] A partially aqueous dispersion of blue pigment (copper phthalocyanine) including about 35% by weight pigment and sold under the Tradename Dispers blue 69-0007 by BASF.
[2] A release agent; available by Ruger Chem. Co.
[3] A silicone surfactant; available from Dow Chemical Co.
[4] An emulsifier; available from Clintwood Chemical Co.
[5] A plasticizer availabe from Monsanto Co.
[6] The latex. A styrene/butadiene emulsion having a styrene:butadiene ratio of about 29:71, a total solid concentration of about 40%, and Mooney viscosity of greater than 100. Sold by Goodyear Tire and Rubber Co. under the Tradename Pliolite SBR Latex Product No. LPF-2108.

EXAMPLE 2

| Ingredient | % by weight |
|---|---|
| Dispers Black[7] | 10% |
| Dow Corning 472[8] | 1% |
| LPF-2108 | 80% |
| Water | 9% |

[7] A partially agenous dispersion of carbon black including about 35% by weight carbon black and sold by BASF.
[8] The release agent; a water dispersible glycol polysiloxane sold by Dow Chemical Co.

EXAMPLE 3

| Ingredient | % by weight |
|---|---|
| Lucony red 3870[9] | 5% |
| Lucony red 3550[9] | 5% |
| Ethfac 391[10] | 1% |
| LPF-2108 | 80% |
| Water | 5% |

[9] A partially soluble aqueous dispersion of a red pigment, including about 35% by weight pigment, and sold by BASF.
[10] An emulsifer; a phosphate ester sold by Ethox Chemical Co.

EXAMPLE 4

| Ingredient | % by weight |
|---|---|
| Dispers black | 6% |
| Santowhite Antioxidant[11] | 0.56% |
| Clindrol 200-0 | 0.44% |
| Dow Corning 193 | 5% |
| LPF 2108 | 70% |
| Water | 18 |

[11] Sold by Monsanto Chemical Co.

EXAMPLE 5

| Ingredient | % by weight |
|---|---|
| Dispers black | 6% |
| Santowhite Antioxidant | 0.56% |
| Clindrol 200-0 | 0.44% |
| DOW CORNING 193 | 2% |
| Silicone fluid | 3% |
| LPF 2108 | 70% |
| Water | 18% |

EXAMPLE 6

| Ingredient | % by weight |
|---|---|
| Lumikol Pink Dispersion[12] | 25% |
| Silicone oil | 2% |
| DOW CORNING 193 | 2% |
| Clindrol 200-0 | 1% |
| LPF 2108 | 70% |

[12] A fluorescent pigment dispersion containg about 25% by weight of pigment; available from Nippon Keiko Kagaku LTD.

EXAMPLE 7

| Ingredient | % by weight |
|---|---|
| Dispers blue | 5% |
| Water | 20% |
| Silicone oil | 2% |
| Dow Corning 193 | 2% |
| Clindrol 200-0 | 1% |
| LPF 2108 | 70% |

EXAMPLE 8

| Ingredient | % by weight |
| --- | --- |
| Lumikol pink dispersion | 25% |
| Silicone oil | 2% |
| DOW CORNING 193 | 2% |
| Clindrol 200-0 | 1% |
| Santowhite antioxidant | 0.5% |
| LPF 2108 | 69.5% |

EXAMPLE 9

| Ingredient | % by weight |
| --- | --- |
| Dispers blue | 5% |
| Water | 19.5% |
| Silicone oil | 2% |
| Dow Corning 193 | 2% |
| Clindrol 200-0 | 1% |
| LPF 2108 | 70% |
| Santowhite antioxidant | 0.5% |

EXAMPLE 10

| Ingredient | % by weight |
| --- | --- |
| Lumikol Yellow Dispersion[13] | 25% |
| Silicone oil | 2% |
| Dow Corning 193 | 2% |
| Clindrol 200-0 | 1% |
| Ethanox 322[14] | 0.5% |
| LPF 2108 | 69.5% |

[13]A fluorescent pigment dispersion containing about by weight pigment; availabe from Nippon Keiko Kagaku LTD.
[14]A preferred anti-oxidant, available from Monsanto Chemical Co.

EXAMPLE 11

| Ingredient | % by weight |
| --- | --- |
| Lumikol Pink Dispersion | 25% |
| Dow Corning 193 | 3% |
| LPF 2108 | 55% |
| Water | 16% |
| Clindrol 200-0 | 1% |

EXAMPLE 12

| Ingredient | % by weight |
| --- | --- |
| LPF 2108 | 55% |
| Clindrol 200-0 | 1% |
| Dow Corning 193 | 2% |
| Water | 14% |
| Lumikol NKW 3003[15] | 25% |
| Drying Agent[16] | 3% |

[15]A red fluorescent pigment available from Nippon Keiko Kagaku LTD.
[16]Either Dowanol DB or EB; available from Dow Chemical Co.

EXAMPLE 13

| Ingredient | % by weight |
| --- | --- |
| LPF 2108 | 40% |
| propylene glycol[17] | 20% |
| Lumikol green[18] | 20% |
| White[19] | 5% |
| Water | 15% |

[17]An anti-drying agent
[18]A green fluorescent pigment available from Nippon Keiko Kagaku LTD.
[19]A white pigment available from BASF.

EXAMPLE 14

| Ingredient | % by weight |
| --- | --- |
| Ethanox 322 | 0.56% |
| Paraplex WP-1[20] | 0.44% |
| Silicone fluid | 3.33% |
| Dow Corning 193 | 2.67% |
| LPF 2108 | 70% |
| DWB-M 601[21] | 6% |
| Water | 17% |

[20]A plasticizer available from Rohm-Haas Chemical Co.
[21]Blue pigment dispersion available from Nikko Bics LTD.

EXAMPLE 15

| Ingredient | % by weight |
| --- | --- |
| Anti-oxidant[22] | 2% |
| Clindrol 200-0 | 1% |
| Dow Corning 193 | 3% |
| Lumikol NKW 3007 | 24% |
| LPF 2108 | 70% |

[22]Either Naugard SP antioxidant or Naugawhite antioxidant. Both are phenols available from Uniroyal.

EXAMPLE 16

| Ingredient | % by weight |
| --- | --- |
| Dispers blue | 5% |
| Dow Corning 193 | 3% |
| Clindrol 200-0 | 1% |
| Propylene glycol | 1% |
| Water | 19.5% |
| Santowhite antioxidant | 0.5% |
| LPF 2108 | 70% |

EXAMPLE 17

| Ingredient | % by weight |
| --- | --- |
| Lumikol NKW 3007 | 25% |
| Dow Corning 193 | 3% |
| Clindrol 200-0 | 1% |
| Santowhite anitoxidant | 0.5% |
| Water | 1.5% |
| LPF 2108 | 69% |

The preferred inks can be used in conventional capillary feed markers that preferably include a polyester fiber tip (or nib) connected to an ink reservoir, preferably also made of polyester fiber. Other types of nibs (e.g., acrylonitrile fibers) and reservoirs (e.g., polyethylene fibers and cellulose acetate fibers) can be used. The reservoir is surrounded by, e.g., a polypropylene barrel, and is capped at the end opposite the nib with, e.g., a polypropylene plug; the marker also includes a polypropylene cap for covering the nib. The reservoirs are available from, e.g., American Filtrona Co. of Richmond, Va., or Baumgartner. The nibs are available from e.g., Aubex Co. of Tokyo, Japan, Teibow or Porex.

During use, because the ink has a relatively low viscosity, the ink is drawn from the reservoir by the tip by capillary action. Passages from, for example, a textbook can be highlighted with the inks, which provide a uniform, transparent covering over the passage. The inks are erasable when applied.

The most preferred composition exhibit erasability characteristics that do not appreciably deteriorate for lengthy periods of time (at least a year). Compositions can be tested for such properties by making a mark on standard 60 lb. offset printing paper and exposing the mark to six hours of sunlight for six consecutive days. The most preferred compositions exhibit approximately the same ease of erasability of the mark using a standard Pink Pearl eraser, (available from Eberhard Faber) after seven days as two hours after application.

Other embodiments are within the claims. For example, the marking composition of the invention may be used in other types of writing instruments, e.g. ballpoint pens, and in other suitable applications, e.g. bottle and brush ink dispensers.

I claim:

1. A method of providing an erasable marking on paper comprising
providing a marker comprising an outer body; a porous writing tip at one end of said body; a fiber reservoir included within said body and connected to said porous writing tip; and within said porous writing tip and said fiber reservoir an aqueous-based, non-shear thinning erasable ink having a viscosity of between 10cps and 30cps and comprising water, a water-insoluble colorant, and a latex, said latex having a viscosity of less than about 50cps and including a styrene/butadiene copolymer having a styrene content of less than 35%; and
contacting said porous writing tip with a paper substrate to transfer said ink from said porous writing tip to said paper substrate to provide an erasable marking, wherein during said contacting said ink is delivered from said fiber reservoir to said porous writing tip via capillary action.

2. The method of claim 1, further comprising the step of erasing said erasable marking from said paper substrate.

3. The method of claim 1, wherein said ink has a viscosity of between 10cps and 20cps.

4. The marker of claim 1, wherein said latex comprises a styrene-butadiene copolymer.

5. The marker of claim 1, wherein said ink further comprises an antioxidant.

6. The marker of claim 1, wherein said ink further comprises a release agent.

7. The marker of claim 1, wherein said ink further comprises a fluorescent pigment.

8. A marker comprising an outer body; a porous writing tip at one end of said body; a fiber reservoir included within said body and connected to said writing tip; and within said reservoir an aqueous-based, non-shear thinning ink that is erasable from 60 lb. offset printing paper, said ink having a viscosity of between 10cps and 30cps and comprising a water-insoluble colorant and a latex, said latex having a viscosity of less than about 50cps and including a styrene/butadiene copolymer having a styrene content of less than 35%;
wherein when said writing tip is contacted with 60 lb. offset printing paper to mark said paper said ink is delivered from said reservoir to said tip by capillary action.

9. The marker of claim 8, wherein said ink has a viscosity of between 10cps and 20cps.

10. The marker of claim 8, wherein said latex comprises a styrene-butadiene copolymer.

11. The marker of claim 8, wherein said ink further comprises an antioxidant.

12. The marker of claim 8, wherein said ink further comprises a release agent.

13. The marker of claim 8, wherein said ink further comprises a fluorescent pigment.

14. A method of providing an erasable marking on a paper substrate comprising
providing a marker comprising an outer body; a porous writing tip at one end of said body; a fiber reservoir included within said body and connected to said porous writing tip; and within said porous writing tip and said fiber reservoir an aqueous-based, non-shear thinning erasable ink having a viscosity of between 10cps and 30cps and comprising water, a water-insoluble colorant, and a latex emulsion, said latex emulsion having a viscosity of less than about 50cps and including a styrene/butadiene copolymer having a styrene content of less than 35%; and
contacting said porous writing tip with a paper substrate to transfer said ink from said porous writing tip to said paper substrate to provide an erasable marking, wherein during said ink is delivered from said fiber reservoir to said porous writing tip via capillary action when said porous writing tip contacts said paper substrate.

15. The method of claim 14, further comprising the step of erasing said erasable marking from said paper substrate.

16. The method of claim 14 wherein said ink has a solids content of less than 50%.

17. The method of claim 14 wherein said latex has a viscosity of less than 50cps.

18. The method of claim 17 wherein said latex has a solids content of less than 50%.

19. The method of claim 16 wherein said latex has a viscosity of less than 50cps and comprises a styrene-butadiene copolymer having a styrene:butadiene ratio of between 10:90 and 35:65.

20. The method of claim 18 wherein said copolymer has a Mooney value of at least 90.

21. The method of claim 14 wherein said ink further comprises a silicone release agent.

22. The method of claim 14 wherein said ink further comprises an anti-oxidant.

23. The method of claim 22 wherein said anti-oxidant is a cresol.

24. The method of claim 14 wherein said colorant is a fluorescent pigment.

25. A marker comprising an outer body; a writing tip at one end of said body; a fiber reservoir included within said body and connected to said writing tip; and within said reservoir an aqueous-based non-shear thinning ink that is erasable from 60 lb. offset printing paper, said ink having a viscosity of between 10cps and 30cps and comprising water, a water-insoluble colorant, and a latex emulsion, said latex emulsion having a viscosity of less than about 50cps and including a styrene/butadiene copolymer having a styrene content of less than 35%;
wherein said tip is porous and said ink is delivered from said fiber reservoir to said tip by capillary action.

26. The marker of claim 25 wherein the viscosity of said ink composition is between 10cps and 20cps.

27. The marker of claim 25 wherein said latex has a rubber solid content of between 20% and 40%.

28. The marker of claim 25 wherein said ink includes between 60% and 90% of said latex by weight.

29. The marker of claim 25 wherein the viscosity of said latex emulsion is less than 50cps.

30. The marker of claim 25 wherein said latex comprises a styrene-butadiene copolymer.

31. The marker of claim 30 wherein said styrene-butadiene copolymer has a Mooney value of at least 90.

32. The marker of claim 30 wherein said copolymer has a styrene:butadiene ratio of between 10:90 and 35:65.

33. The marker of claim 25 wherein said ink includes a release agent.

34. The marker of claim 33 wherein said release agent is a silicone.

35. The marker of claim 25 wherein said ink includes an anti-oxidant.

36. The marker of claim 35 wherein said anti-oxidant is a cresol.

37. The marker of claim 35 wherein said colorant is a fluorescent pigment.

38. The marker of claim 29 wherein said latex has a solids content of less than 50%.

39. The marker of claim 38 wherein said latex comprises styrene-butadiene copolymer having a styrene:butadiene ratio of between 10:90 and 35:65.

40. The marker of claim 39 wherein said marking composition further comprises a fluorescent pigment.

41. The marker of claim 25 wherein said latex has a solids content of less than 50%.

42. The marker of claim 38 wherein said marking composition further comprises a silicone release agent.

* * * * *

UNITED STATES PATENT AND TRADEMARK OFFICE
CERTIFICATE OF CORRECTION

PATENT NO. : 5,362,167

DATED : November 8, 1994

INVENTOR(S) : Rachel M. Loftin

It is certified that error appears in the above-identified patent and that said Letters Patent is hereby corrected as shown below:

On the Title page, item [56], U.S. Patent Documents should read --

```
3,266,914   8/1966   Varron
3,554,746   1/1971   Merrill et al.
3,712,871   1/1973   Pasternack
3,804,774   4/1974   Betts et al.
3,843,823   9/1974   Seregely et al.
3,886,083   5/1975   Laxer
3,928,226  12/1975   McDonough et al.
3,941,488   3/1976   Maxwell
3,945,837   3/1976   Miyata et al.
3,948,668   4/1976   Hayek et al.
3,985,663  10/1976   Lu et al.
3,991,032  11/1976   Pace
4,015,131   3/1977   McDonough et al.
4,043,820   8/1977   Landan
4,059,554  11/1977   Pacamsky
4,076,494   2/1978   Schuster et al.
4,077,807   3/1978   Kramer et al.
4,097,289   6/1978   Hofmann et al.
4,101,329   7/1978   Loock
4,108,782   8/1978   Thompson
4,111,878   9/1978   Ruhf
4,148,944   4/1979   Ruhf
4,150,997   4/1979   Hayes
4,153,593   5/1979   Zabiak et al.
```

UNITED STATES PATENT AND TRADEMARK OFFICE
CERTIFICATE OF CORRECTION

PATENT NO. : 5,362,167

DATED : November 8, 1994

INVENTOR(S) : Rachel M. Loftin

It is certified that error appears in the above-identified patent and that said Letters Patent is hereby corrected as shown below:

```
4,162,997   7/1979   Walsh
4,186,020   1/1980   Wachtel
4,221,601   9/1980   Augustin et al.
4,235,981  11/1980   Tunchaya
4,243,694   1/1981   Mansukhani
4,248,746   2/1981   Greiner
4,256,494   5/1981   Yamamoto et al.
4,290,072   9/1981   Mansukhani
4,352,901  10/1982   Maxwell et al.
4,357,431  11/1982   Murakami et al.
4,520,063   5/1985   Simon et al.
4,530,961   7/1985   Nguyen et al.
4,545,818  10/1985   Inoue et al.
4,565,576   1/1986   Salgo et al.
4,606,842   8/1986   Keyes et al.
4,629,748  12/1986   Miyajima et al.
4,655,834   4/1987   Haruta et al.
4,673,727   6/1987   Miller, Jr.
4,687,791   8/1987   Miyajima et al.
4,740,549   4/1988   Okuzono et al.
4,744,826   5/1988   Iijima
4,753,998   6/1988   Hayes et al.
4,760,104   7/1988   Miyajima et al.
4,762,875   8/1988   Gold
4,765,243   8/1988   Schiefer et al.
4,773,937   9/1988   Schneider et al.
4,786,198  11/1988   Zgambo
4,853,037   8/1989   Johnson et al.
4,859,728   8/1989   Schneider et al.
4,877,451  10/1989   Wissik et al.
4,880,565  11/1989   Rose et al. --.
```

UNITED STATES PATENT AND TRADEMARK OFFICE
CERTIFICATE OF CORRECTION

PATENT NO.    : 5,362,167

DATED         : November 8, 1994

INVENTOR(S)   : Rachel M. Loftin

It is certified that error appears in the above-identified patent and that said Letters Patent is hereby corrected as shown below:

```
4,889,765   12/1989   Wallace
4,892,787    1/1990   Kruse et al.
4,935,461    6/1990   Nakamura
4,954,174    9/1990   Imagawa
4,960,464   10/1990   Chen
4,963,188   10/1990   Parker
4,988,123    1/1991   Lin et al.
5,004,763    4/1991   Imagawa
5,009,708    4/1991   Grunwald et al.
5,019,166    5/1991   Schwarz
5,026,755    6/1991   Kveglis et al.
5,037,702    8/1991   Pitts et al.
5,062,891   11/1991   Gruber et al.
5,062,892   11/1991   Halko
5,089,050    2/1992   Vieira et al.
5,091,006    2/1992   Sarada et al.
5,106,416    4/1992   Moffatt et al.
5,106,417    4/1992   Hauser et al.
5,114,479    5/1992   Keaveney et al.
5,129,947    7/1992   Sharma et al.
5,131,776    7/1992   Mott
5,135,569    8/1992   Mathias
5,203,913    4/1993   Yamamoto et al.
```

Foreign Patent Documents should read as follows: --

```
1347262      2/1974   England
0044378A1    1/1982   Europe
0264897A2    4/1988   Europe
0294044A1   12/1988   Europe
```

UNITED STATES PATENT AND TRADEMARK OFFICE
CERTIFICATE OF CORRECTION

PATENT NO. : 5,362,167

DATED : November 8, 1994

INVENTOR(S) : Rachel M. Loftin

It is certified that error appears in the above-identified patent and that said Letters Patent is hereby corrected as shown below:

```
0304887B1   3/1989   Europe
0322805B1   7/1989   Europe
0337705A2  10/1989   Europe
0407201A1   1/1991   Europe
0439026A2   7/1991   Europe
834459      5/1978   Germany
835006     10/1978   Germany
033406     10/1991   Japan
045374      9/1983   Japan
120667      7/1984   Japan
228273      7/1988   Japan
229475      7/1984   Japan
2169678    12/1988   Japan
1-174577    7/1989   Japan
2-209973    2/1989   Japan
3-52505     7/1989   Japan
51-74708   12/1974   Japan
52-134507   5/1976   Japan
60-203681  10/1985   Japan
62-101672  10/1985   Japan
62-265374  11/1987   Japan
63-163466  12/1986   Japan
63-210181   2/1987   Japan
82-59147   10/1983   Japan
83-152069   9/1983   Japan
1337467    11/1973   United Kingdom
WO88/00961  2/1988   PCT --.
```

UNITED STATES PATENT AND TRADEMARK OFFICE
CERTIFICATE OF CORRECTION

PATENT NO. : 5,362,167

DATED : November 8, 1994

INVENTOR(S) : Rachel M. Loftin

It is certified that error appears in the above-identified patent and that said Letters Patent is hereby corrected as shown below:

Other Publications should read as follows: --

Preuss, "Pigments in Paint -- Part 2 - White Hiding Pigments (Section A)", Noyes Data Corporation, pp. 1-6, 1974.

The American Society for Testing and Materials, "Standard Test Method for Determining the Erasability of Inked Ribbons", ASTM, Designation: F362-85, pp. 915-916.

BASF, Technical Information - COLOR, "Lumogen® Yellow S 0790", pp. 1-6, May 1985.

Dayglo® Color Corp., "Fluorescent Pigments, Technical Bulletin 2002, pp. 1-27. --.

Column 9, line 2, delete "composition".
Column 10, line 7, "claim 35" should be --claim 25--.

Signed and Sealed this

Twenty-third Day of April, 1996

BRUCE LEHMAN

Attest:

Attesting Officer

Commissioner of Patents and Trademarks